(12) United States Patent
Saito et al.

(10) Patent No.: US 10,563,087 B2
(45) Date of Patent: Feb. 18, 2020

(54) POWDER COATING MATERIAL, COATED ARTICLE AND PROCESSES FOR THEIR PRODUCTION

(71) Applicant: AGC Inc., Chiyoda-ku (JP)

(72) Inventors: Shun Saito, Chiyoda-ku (JP); Masataka Aikawa, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 391 days.

(21) Appl. No.: 14/971,239

(22) Filed: Dec. 16, 2015

(65) Prior Publication Data

US 2016/0096975 A1 Apr. 7, 2016

Related U.S. Application Data

(63) Continuation of application No. PCT/JP2014/069848, filed on Jul. 28, 2014.

(30) Foreign Application Priority Data

Jul. 29, 2013 (JP) .................. 2013-157168

(51) Int. Cl.
C09D 167/03 (2006.01)
C09D 7/40 (2018.01)
C09D 127/12 (2006.01)
C09D 127/16 (2006.01)

(52) U.S. Cl.
CPC ............. *C09D 167/03* (2013.01); *C09D 7/40* (2018.01); *C09D 127/12* (2013.01); *C09D 127/16* (2013.01)

(58) Field of Classification Search
CPC .......... C09D 127/12–20; C09D 133/00; C09D 163/00; C09D 175/04
See application file for complete search history.

(56) References Cited

U.S. PATENT DOCUMENTS

| | | | | |
|---|---|---|---|---|
| 5,346,727 A * | 9/1994 | Simkin | ............... | C09D 127/16 427/195 |
| 5,470,893 A * | 11/1995 | Sinclair-Day | ............ | C08J 3/203 523/200 |
| 6,251,521 B1 * | 6/2001 | Eian | ...................... | C08F 265/04 428/402.21 |
| 6,803,419 B2 * | 10/2004 | Tsuda | .................. | C09D 127/16 525/197 |
| 7,244,780 B1 * | 7/2007 | Robinson | .............. | C09D 5/032 524/441 |
| 9,714,360 B2 * | 7/2017 | Saito | ....................... | C09D 5/03 |
| 2001/0051227 A1 * | 12/2001 | Jung | ..................... | B05D 1/265 427/486 |
| 2004/0096669 A1 * | 5/2004 | Kim | ................... | C08G 18/4063 428/423.1 |
| 2004/0176554 A1 * | 9/2004 | Ishida | ................. | C08F 214/186 526/242 |
| 2004/0230008 A1 * | 11/2004 | Correll | .................... | C08J 3/243 525/326.2 |

FOREIGN PATENT DOCUMENTS

| | | | | |
|---|---|---|---|---|
| CN | 103173073 A | * | 6/2013 | |
| JP | 52-43840 | | 4/1977 | |
| JP | 2004-175813 | | 6/2004 | |
| JP | 2010-221113 | | 10/2010 | |
| JP | 2011-12119 | | 1/2011 | |
| JP | 2012-40503 | | 3/2012 | |
| JP | 2012-41383 | | 3/2012 | |
| JP | 2013-76019 | | 4/2013 | |
| WO | WO 2012/048650 A1 | | 4/2012 | |
| WO | WO-2013141915 A1 | * | 9/2013 | ............... C09D 5/03 |
| WO | WO 2013/186832 A1 | | 12/2013 | |
| WO | WO 2014/002964 A1 | | 1/2014 | |

OTHER PUBLICATIONS

Machine translation of CN 103173073 A, retrieved Apr. 2018. (Year: 2018).*
International Search Report dated Oct. 14, 2014 in PCT/JP2014/069848 filed Jul. 28, 2014.

* cited by examiner

Primary Examiner — Nicole M. Buie-Hatcher
(74) Attorney, Agent, or Firm — Oblon, McClelland, Maier & Neustadt, L.L.P.

(57) ABSTRACT

To provide a powder coating material capable of forming, by one coating, a cured film which has a double-layered structure comprising a cured resin layer and a fluororesin layer and which is excellent in weather resistance, wherein the fluororesin layer is less likely to be peeled for a long period of time; a coated article; and processes for their production. The powder coating material comprises a powder (X) composed of a composition ($\alpha$) comprising a fluororesin (A) and an ultraviolet absorber (B), and a powder (Y) composed of a composition ($\beta$) comprising a thermosetting resin (C) other than a fluororesin, a curing agent (D) and a light stabilizer (E).

17 Claims, No Drawings

POWDER COATING MATERIAL, COATED ARTICLE AND PROCESSES FOR THEIR PRODUCTION

CROSS-REFERENCE TO RELATED APPLICATIONS

This application is a Continuation of PCT/JP2014/069848, which was filed on Jul. 28, 2014. This application is based upon and claims the benefit of priority to Japanese Application No. 2013-157168, which was filed on Jul. 29, 2013. The contents of these applications are incorporated herein by reference in their entireties.

TECHNICAL FIELD

The present invention relates to a powder coating material, a coated article and processes for their production.

BACKGROUND ART

In recent years, global scale environmental destruction problems such as global warming, ozone layer depletion, acid rain, etc. have gained prominent attention. Internationally, environmental pollution measures are advocated, and various regulations have been established from the viewpoint of environmental protection. Among them, release into the atmosphere of organic solvents (VOC) has been a serious problem, and also in each industry, the movement for de-organic solvents (de-VOC) along with the trend for strengthening VOC regulations has become active. Also in the paint industry, as a substitute for conventional organic solvent-based coating material, a powder coating material is highly expected as a coating material which contains no VOC and which is friendly to the environment as it can be recovered and reused without requiring exhaust treatment or wastewater treatment.

As such a powder coating material, an acrylic resin powder coating material, a polyester resin powder coating material or an epoxy resin powder coating material, is mainly used.

However, cured films formed by using these powder coating materials have such a drawback that they are poor in weather resistance.

As a powder coating material to overcome such a drawback, a hybrid powder coating material has been proposed, wherein a powder containing a polyester resin and a powder containing a fluororesin are dry-blended (see e.g. Patent Documents 1 to 3).

Using such a hybrid powder coating material, it is possible to form, by one coating, a cured film having a double-layered structure comprising a cured resin layer made of the polyester resin on the substrate side and a fluororesin layer on the air side. Such a cured film is excellent in weather resistance, since it has a fluororesin layer on the air side.

PRIOR ART DOCUMENTS

Patent Documents

Patent Document 1: JP-A-2010-221113
Patent Document 2: JP-A-2012-040503
Patent Document 3: WO2012/048650

DISCLOSURE OF INVENTION

Technical Problem

However, according to a study by the present inventors, cured films formed by using the hybrid powder coating materials as disclosed in Patent Documents 1 to 3, have such a drawback that when they are exposed to outdoor environment for a long period of time, the fluororesin layer tends to be easily peeled. This is considered to be such that the cured resin layer is deteriorated by ultraviolet rays, whereby the adhesion at the interface with the fluororesin layer is decreased. Especially when the hybrid powder coating material contains a pigment, the pigment tends to be localized in the cured resin layer, and a gap is likely to be formed between the cured product of the polyester resin and the pigment. If water penetrates into the gap, the cured resin layer tends to be further deteriorated by a photocatalytic action of the pigment (titanium oxide, etc.).

Further, according to the study by the present inventors, when both of the powder containing a polyester resin and the powder containing a fluororesin, contain a curing agent, there will be a drawback such that the cured film will be poor in surface smoothness, flexibility and impact resistance.

It is an object of the present invention to provide a powder coating material capable of forming, by one coating, a cured film which has a double-layered structure comprising a cured resin layer and a fluororesin layer and which is excellent in weather resistance, whereby the fluororesin layer is less likely to be peeled over a long period of time; a coated article having, on its surface, a cured film which has a double-layered structure comprising a cured resin layer and a fluororesin layer, and which is excellent in weather resistance, whereby the fluororesin layer is less likely to be peeled over a long period of time; and processes for their production.

Solution to Problem

The present invention provides a powder coating material, a coated article and processes for their production, having the following constructions [1] to [15].

[1] A powder coating material which comprises:
a powder (X) composed of a composition ($\alpha$) comprising a fluororesin (A) and an ultraviolet absorber (B), and
a powder (Y) composed of a composition ($\beta$) comprising a thermosetting resin (C) other than a fluororesin, a curing agent (D) and a light stabilizer (E).
[2] The powder coating material according to [1], wherein the mixing ratio of the powder (X) to the powder (Y) (i.e. powder (X)/powder (Y)) is form 20/80 to 80/20 (mass ratio).
[3] The powder coating material according to [1] or [2], wherein the fluororesin (A) is a hydroxy group-containing fluorinated polymer (A1).
[4] The powder coating material according to [3], wherein the curing agent (D) in the composition ($\beta$) is a blocked isocyanate curing agent, and the composition ($\alpha$) contains substantially no such a blocked isocyanate curing agent.
[5] The powder coating material according to [1] or [2], wherein the fluororesin (A) is a polyvinylidene fluoride.
[6] The powder coating material according to [5], wherein the composition ($\alpha$) further contains an acrylic resin (J).
[7] The powder coating material according to any one of [1] to [6], wherein the thermosetting resin (C) is at least one member selected from the group consisting of a curable acrylic resin, a curable polyester resin, a curable epoxy resin and a curable urethane resin.
[8] The powder coating material according to any one of [1] to [7], wherein the thermosetting resin (C) is a curable polyester resin, and the curing agent (D) is a blocked isocyanate curing agent.

[9] The powder coating material according to any one of [1] to [8], wherein either one or both of the composition (α) and the composition (β) further contain a pigment (F).

[10] The powder coating material according to any one of [1] to [8], wherein either one or both of the powder (X) and the powder (Y) contain, as powder particles constituting the powder, powder particles having a luster pigment attached to the powder particle surfaces.

[11] A process for producing a powder coating material as defined in [1], which comprises the following step (a1), step (b1), step (a2), step (b2) and step (d):

(a1) a step of melt-kneading a mixture comprising the fluororesin (A) and the ultraviolet absorber (B) to obtain a kneaded product composed of the composition (α), (b1) a step of pulverizing the kneaded product composed of the composition (α) to obtain the powder (X), (a2) a step of melt-kneading a mixture comprising the thermosetting resin (C) other than a fluororesin, the curing agent (D) and the light stabilizer (E) to obtain a kneaded product composed of the composition (β), (b2) a step of pulverizing the kneaded product composed of the composition (β) to obtain the powder (Y), and (d) a step of dry-blending the powder (X) and the powder (Y).

[12] The process for producing a powder coating material according to [11], wherein either one or both of the mixture in the step (a1)) and the mixture in the step (a2) further contain a pigment (F).

[13] The process for producing a powder coating material according to [11], wherein before dry-blending in the step (d), a luster pigment is attached to the powder particle surfaces of either one or both of the powder (X) and the powder (Y), and then, the powder (X) and the powder (Y) are dry-blended.

[14] A coated article having a cured film of the powder coating material as defined in any one of [1] to [10], on the surface of a substrate.

[15] A process for producing a coated article having a cured film on the surface of a substrate, which comprises the following step (e) and step (f):

(e) a step of coating a substrate with the powder coating material as defined in any one of [1] to [10], to form a coating film made of a melt of the powder coating material, and (f) a step of curing the coating film to form a cured film.

Advantageous Effects of Invention

The powder coating material of the present invention is capable of forming, by one coating, a cured film which has a double-layered structure comprising a cured resin layer and a fluororesin layer and which is excellent in weather resistance, whereby the fluororesin layer is less likely to be peeled over a long period of time.

According to the process for producing a powder coating material of the present invention, it is possible to produce a powder coating material that exhibits the above effect.

The coated article of the present invention has a cured film which has a double-layered structure comprising a cured resin layer and a fluororesin layer and which is excellent in weather resistance, whereby the fluororesin layer is less likely to be peeled over a long period of time.

According to the process for producing a coated article of the present invention, it is possible to produce a coated article having such a cured film on the surface.

DESCRIPTION OF EMBODIMENTS

The following definitions of terms apply throughout the specification and claims.

The "thermosetting resin" is meant for a compound having a reactive group capable of reacting with a curing agent by heating.

The "ultraviolet absorber" is meant for a compound to be used as an additive for the purpose of protecting a resin, etc. from a chemical action of ultraviolet light, which absorbs ultraviolet light with a wavelength of at most 400 nm, to efficiency disperse it as thermal energy and which is stable to light.

The "light stabilizer" is meant for a compound to be used as an additive for the purpose of suppressing deterioration of a resin, etc. due to light, which has an effect to suppress deterioration of a resin, etc. due to light, by an action of other than UV-absorber (a radical-scavenger, etc.).

The "dry blend" is meant for mixing two or more powders without melting the powders or without addition of a solvent.

The "coating film" is meant for a film made from a melt of the powder coating material formed by applying the powder coating material.

The "cured film" is meant for a film formed by curing the coating film.

The "one coating" is meant for coating only once.

The "powder coating material is melted and cured" means that a powder coating material is made in a molten state, and reactive components therein are reacted for curing.

The "(meth)acrylate" is a generic term for an acrylate and a methacrylate.

The "unit" is meant for a moiety derived from a monomer and being present in a polymer to constitute the polymer. A unit derived from a monomer having a carbon-carbon unsaturated double bond, by addition polymerization of the monomer, is a bivalent unit formed by cleavage of the unsaturated double bond. A unit derived from a polyvalent carboxylic acid compound constituting a polyester resin, is a monovalent or higher valent unit formed by eliminating a hydroxy group from at least one carboxy group in the polyvalent carboxylic acid compound, and a unit derived from a polyhydric alcohol compound is a monovalent or higher valent unit formed by eliminating a hydrogen atom from at least one hydroxy group in the polyhydric alcohol compound. Further, one having a structure of a certain unit chemically converted after formation of a polymer, may also be called a unit.

Hereinafter, as the case requires, units derived from an individual monomer may be called by a name having "units" attached to the monomer name.

[Powder Coating Material]

The powder coating material of the present invention comprises the following powder (X) and the following powder (Y).

Powder (X): a powder composed of a composition (α) comprising a fluororesin (A) and an ultraviolet absorber (B). The composition (α) may contain, as the case requires, a curing agent (D), a light stabilizer (E), a pigment (F), a curing catalyst (G), and other component (H).

Powder (Y): a powder composed of a composition (β) comprising a thermosetting resin (C) other than a fluororesin, a curing agent (D) and a light stabilizer (E). The composition (β) may contain, as the case requires, an ultraviolet absorber (B), a pigment (F), a curing catalyst (G), and other component (H).

The powder coating material of the present invention is applied on a substrate by one coating and heated to form a coating film composed of a melt of the powder coating material and to let reactive components in the coating film be reacted, to obtain a cured film. At the time of obtaining the cured film, a fluororesin layer derived from the powder (X), and a cured resin layer composed mainly of a cured product of the thermosetting resin (C) derived from the powder (Y) undergo layer separation. In the present invention, such reaction, curing and layer separation may proceed simultaneously. In the cured film, the cured resin layer is disposed on the substrate side, and the fluororesin layer is disposed on the air side.

(Fluororesin (A))

The fluororesin (A) may, for example, be a homopolymer or copolymer of a fluoroolefin. The copolymer may, for example, be a copolymer of two or more fluoroolefins, a copolymer of at least one fluoroolefin and at least one fluorinated monomer other than a fluoroolefin, a copolymer of at least one fluoroolefin and at least one monomer having no fluorine atom, or a copolymer of at least one fluoroolefin, at least one fluorinated monomer other than a fluoroolefin and at least one monomer having no fluorine atom.

As a monomer copolymerizable with a fluoroolefin, a compound other than a fluoroolefin having a carbon-carbon double bond, is preferred. A monomer having a carbon-carbon double bond is excellent in alternating copolymerizability with a fluoroolefin, whereby the polymerization yield can be made high. Further, even when it remains unreacted, it presents less influence on the cured film and can be easily removed in the production process.

The fluororesin (A) is composed of a heat-melt fluoroolefin polymer. The heat-melt fluoroolefin polymer may also be a fluoroolefin polymer having reactive groups such as hydroxy groups. The fluoroolefin polymer having reactive groups is preferably one which can be cured by being reacted with a curing agent (D). In such a case, the fluororesin of the fluororesin layer in the cured film is made of a cured product of the fluoroolefin polymer having reactive groups.

A fluoroolefin is a compound having one or more hydrogen atoms in a hydrocarbon olefin (general formula: $C_nH_{2n}$) substituted by fluorine atoms.

The number of carbon atoms in the fluoroolefin is preferably from 2 to 8, particularly preferably from 2 to 6.

The number of fluorine atoms in the fluoroolefin is preferably 2 or more, particularly preferably 3 or 4. When the number of fluorine atoms is 2 or more, the weather resistance of the cured film will be excellent. In the fluoroolefin, at least one hydrogen atom not substituted by a fluorine atom may be substituted by a chlorine atom. When the fluoroolefin has a chlorine atom, a pigment, etc. (especially a colored organic pigment such as cyanine blue, cyanine green, etc.) can be easily dispersed in the fluororesin (A). Further, the glass transition temperature of the fluororesin (A) can be designed to be at least 50° C., whereby it is possible to suppress blocking of a cured film.

As the fluoroolefin, tetrafluoroethylene (hereinafter referred to also as "TFE"), chlorotrifluoroethylene (hereinafter referred to also as "CTFE"), hexafluoropropylene, vinylidene fluoride and vinyl fluoride are preferred, and TFE and CTFE are particularly preferred.

As the fluoroolefin, one type may be used alone, or two or more types may be used in combination.

As fluoroolefin units, units formed directly by the polymerization of a fluoroolefin are preferred.

The fluorinated monomer other than a fluoroolefin may be a monomer having fluorine atoms, such as a fluoroalkyl (alkyl vinyl ether), a perfluoro(alkyl vinyl ether), etc. The monomer having fluorine atoms may have a reactive group.

The monomer having no fluorine atom may be a monomer having no reactive group or a monomer having a reactive group. The monomer having no reactive group may, for example, be an olefin or a vinyl ether having no reactive group. The monomer having a reactive group may, for example, be a monomer having a hydroxy group.

A fluorinated polymer having no reactive group may, for example, be a TFE-perfluoro(alkyl vinyl ether) copolymer (hereinafter referred to also as "PFA"), a TFE-hexafluoropropylene copolymer, a TFE-perfluoro(alkyl vinyl ether)-hexafluoropropylene copolymer, an ethylene-TFE copolymer (hereinafter referred to also as "ETFE"), polyvinylidene fluoride (hereinafter referred to also as "PVDF"), polyvinyl fluoride, polychlorotrifluoroethylene, an ethylene-CTFE copolymer, etc.

The fluorinated polymer having no reactive group may further have, as the case requires, units derived from other monomers within a range not to impair the essential properties thereof.

Other monomers are monomers other than the monomers forming the essential units as units constituting the fluorinated polymer (e.g. ethylene and TFE in ETFE, TFE and a perfluoro(alkyl vinyl ether) in PFA).

As such other monomer, vinylidene fluoride is particularly preferred, since the obtainable fluoropolymer is excellent in adhesion to a substrate (in particular an aluminum substrate), and fixing of an aluminum curtain wall with a sealing agent becomes easy.

The melting point of the fluorinated polymer having no reactive group, is preferably at most 300° C., more preferably at most 200° C., particularly preferably at most 180° C. When the melting point of the fluorinated polymer is at most the above upper limit value, an obtainable cured film will be excellent in surface smoothness.

As the fluororesin (A) being a fluorinated polymer having no reactive group, PVDF is preferred from the viewpoint of excellent flexibility and impact resistance of the fluororesin layer. When the composition (α) contains PVDF as a fluororesin (A), it preferably further contains an acrylic resin (J) from the viewpoint of excellent adhesion to a substrate.

From the viewpoint of excellent stain resistance, water resistance, acid resistance and alkali resistance, the fluororesin (A) is preferably a fluorinated polymer having reactive groups. The reactive groups may, for example, be hydroxy groups, carboxy groups, amino groups, etc. As the fluororesin (A), a fluorinated polymer (A1) containing hydroxy groups (hereinafter referred to also as a "hydroxy group-containing fluorinated polymer (A1)") is particularly preferred. A hydroxy group-containing fluorinated polymer (A1) contains hydroxy groups, whereby the curing speed will be excellent in a case where an isocyanate-type curing agent (particularly a blocked isocyanate curing agent (D1)) is used, as the curing agent. Further, it is preferred in that it becomes easy to disperse a pigment, etc., and it is possible to obtain a cured film having a high-gloss (a 60° gloss of at least 60).

The curing agent is incorporated to the powder (X) together with the hydroxy group-containing fluorinated polymer (A1). However, as described later, in a case where the curing agent (D) contained in the powder (Y) is a blocked isocyanate curing agent or the like, it may be preferable to cure the hydroxy group-containing fluorinated polymer (A1) by the curing agent (D) contained in the powder (Y), without incorporating a curing agent to the powder (X).

The hydroxy group-containing fluorinated polymer (A1)) is preferably a hydroxy group-containing fluorinated polymer having units derived from a fluoroolefin, units derived from a monomer having a hydroxy group (hereinafter referred to also as "monomer (a1)") copolymerizable with the fluoroolefin, and, as the case requires, units derived from another monomer (hereinafter referred to also as "monomer (a2)") other than the fluoroolefin and the monomer (a1).

The hydroxy group-containing fluorinated polymer (A1)) may be a hydroxy group-containing fluorinated polymer having hydroxy groups introduced by conversion of reactive groups of a polymer. As such a hydroxy group-containing fluorinated polymer, preferred is a fluorinated polymer obtainable by reacting a fluorinated polymer having units derived from a fluoroolefin, units derived from a monomer having a reactive functional group other than a hydroxy group, and, if required, units derived from the above-mentioned monomer (a2), with a compound having a second reactive functional group reactive with said reactive functional group, and a hydroxy group.

The monomer (monomer (a1), monomer (a2), etc.) to be copolymerized with a fluoroolefin may be a monomer having fluorine atoms other than a fluoroolefin, but is preferably a monomer having no fluorine atom.

The monomer (a1) is a monomer having a hydroxy group.

The monomer having a hydroxy group may, for example, be allyl alcohol, a hydroxyalkyl vinyl ether (such as 2-hydroxyethyl vinyl ether, 4-hydroxybutyl vinyl ether, cyclohexanediol monovinyl ether, etc.), a hydroxyalkyl allyl ether (such as 2-hydroxyethyl allyl ether, etc.), a vinyl hydroxy alkanoate (vinyl hydroxypropionate, etc.), or a hydroxyalkyl (meth)acrylate (such as hydroxyethyl (meth)acrylate, etc.).

As the monomer (a1), one type may be used alone, or two or more types may be used in combination.

The monomer (a2) may, for example, be a vinyl ether, an allyl ether, a carboxylic acid vinyl ester, a carboxylic acid allyl ester, an olefin, etc., having no reactive group.

The vinyl ether may, for example, be a cycloalkyl vinyl ether (such as cyclohexyl vinyl ether (hereinafter referred to also as "CHVE"), etc.), or an alkyl vinyl ether (such as nonyl vinyl ether, 2-ethylhexyl vinyl ether, hexyl vinyl ether, ethyl vinyl ether, n-butyl vinyl ether, tert-butyl vinyl ether, etc.).

The allyl ether may, for example, be an alkyl allyl ether (such as ethyl allyl ether, hexyl allyl ether, etc.).

The carboxylic acid vinyl ester may, for example, be a vinyl ester of a carboxylic acid (such as acetic acid, butyric acid, pivalic acid, benzoic acid, or propionic acid). Further, as a vinyl ester of a carboxylic acid having a branched alkyl group, commercially available VeoVa-9 or VeoVa-10 (each manufactured by Shell Chemical Co., trade name) may be used.

The carboxylic acid allyl ester may, for example, be an allyl ester of a carboxylic acid (such as acetic acid, butyric acid, pivalic acid, benzoic acid, or propionic acid).

The olefin may, for example, be ethylene, propylene, or isobutylene.

The monomer (a2) is preferably a cycloalkyl vinyl ether, particularly preferably CHVE, from such a viewpoint that the glass transition temperature of a hydroxy group-containing fluorinated polymer (A1) can be designed to be at least 50° C., and it is possible to suppress blocking of a cured film.

The monomer (a2) is preferably one having a linear or branched alkyl group having 3 or more carbon atoms, from such a viewpoint that an obtainable cured film will be excellent in flexibility.

As the monomer (a2), one type may be used alone, or two or more types may be used in combination.

As a combination of monomers constituting the hydroxy group-containing fluorinated polymer (A1), from the viewpoint of weather resistance, adhesion, flexibility, and blocking resistance, the following combination (1) is preferred, and the following combination (2) or (3) is particularly preferred.

Combination (1)
   Fluoroolefin: TFE or CTFE,
   Monomer (a1): a hydroxy alkyl vinyl ether,
   Monomer (a2): at least one member selected from the group consisting of a cycloalkyl vinyl ether, an alkyl vinyl ether and a carboxylic acid vinyl ester.

Combination (2)
   Fluoroolefin: TFE,
   Monomer (a1): a hydroxy alkyl vinyl ether,
   Monomer (a2): CHVE or a tert-butyl ether.

Combination (3)
   Fluoroolefin: CTFE,
   Monomer (a1): a hydroxy alkyl vinyl ether,
   Monomer (a2): CHVE or a tert-butyl ether.

The proportion of fluoroolefin units is preferably from 30 to 70 mol %, particularly preferably from 40 to 60 mol % in the total units (100 mol %) in the hydroxy group-containing fluorinated polymer (A1). When fluoroolefin units are at least the above lower limit value, the obtainable cured film will be excellent in weather resistance. When fluoroolefin units are at most the above upper limit value, the adhesion between the fluororesin layer and the cured resin layer will be excellent when the layers are separated.

The proportion of monomer (a1)) units is preferably from 0.5 to 20 mol %, particularly preferably from 1 to 15 mol %, in the total units (100 mol %) in the hydroxy group-containing fluorinated polymer (A1). When the proportion of monomer (a1) units is at least the above lower limit value, the adhesion between the fluororesin layer and the cured resin layer will be excellent when the layers are separated. When the proportion of the monomer (a1)) units is at most the above upper limit value, the obtainable cured film will be excellent in abrasion resistance.

The proportion of monomer (a2) units is preferably from 20 to 60 mol %, particularly preferably from 30 to 50 mol %, in the total units (100 mol %) in the hydroxy group-containing fluorinated polymer (A1). When the proportion of monomer (a2) units is at least the above lower limit value, the glass transition temperature of the hydroxy group-containing fluorinated polymer (A1) will be proper, and it will be easy to produce a powder coating material. When the proportion of monomer (a2) units is at most the above upper limit value, the adhesion between the fluororesin layer and the cured resin layer will be excellent when the layers were separated.

The number average molecular weight of the hydroxy group-containing fluorinated polymer (A1) is preferably from 3,000 to 50,000, particularly preferably from 5,000 to 30,000. When the number average molecular weight of the hydroxy group-containing fluorinated polymer (A1) is at least the above lower limit value, the obtainable cured film will be excellent in water resistance and salt water resistance. When the number average molecular weight of the hydroxy group-containing fluorinated polymer (A1) is at most the above upper limit value, the obtainable cured film will be excellent in surface smoothness.

The hydroxy value of the hydroxy group-containing fluorinated polymer (A1) is preferably from 5 to 100 mgKOH/g, particularly preferably from 10 to 80 mgKOH/g. When the hydroxy value of the hydroxy group-containing fluorinated polymer (A1) is at least the above lower limit value, the adhesion between the fluororesin layer and the cured resin layer will be excellent when the layers are separated. When the hydroxy value of the hydroxy group-containing fluorinated polymer (A1) is at most the above upper limit value, the obtainable cured film will be excellent in crack resistance under temperature cycles between a high temperature of at least 100° C. and a low temperature of at most 10° C. Measurement of the hydroxy value is carried out in accordance with JIS K1557-1 (2007 edition).

The glass transition temperature of the hydroxy group-containing fluorinated polymer (A1) is preferably from 40 to 150° C., more preferably from 45 to 120° C., particularly preferably from 50 to 100° C. When the glass transition temperature of the hydroxy group-containing fluorinated polymer (A1) is at least the above lower limit value, it will be easy to produce a powder coating material. When the glass transition temperature of the hydroxy group-containing fluorinated polymer (A1) is at most the upper limit value, the surface smoothness of the obtainable cured film will be good.

(Ultraviolet Absorber (B))

When the composition (α) as the material for the powder (X) contains an ultraviolet absorber (B), the ultraviolet absorber (B) tends to be concentrated in the fluororesin layer. Therefore, the amount of ultraviolet rays passing through the fluororesin layer and reaching the cured resin layer, decreases, whereby deterioration of the cured resin layer is suppressed, and it is possible to avoid such a problem that the fluororesin layer is peeled from the cured resin layer.

In the present invention, an ultraviolet absorber (B) may be incorporated, not only in the composition (α) as the material for the powder (X), but also in the composition (β) as the material for the powder (Y), so that the ultraviolet absorber (B) is concentrated also in the cured resin layer. However, with a view to reducing the cost, it is preferred that the ultraviolet absorber (B) is not present in the cured resin layer as far as possible, i.e. is not incorporated in the composition (β) as the material for the powder (Y).

In the melting and curing process of the powder coating material, in order to facilitate concentration of the ultraviolet absorber (B) in the fluororesin layer, it is preferred to select an ultraviolet absorber (B) which tends to be easily concentrated in the fluororesin layer, in consideration of physical properties, etc. of the ultraviolet absorber (B). For example, as between a lipophilic ultraviolet absorber (B) and a hydrophilic ultraviolet absorber (B), the lipophilic ultraviolet absorber (B) tends to be more easily concentrated in the fluororesin layer. Further, the affinity to the fluororesin (A) may sometimes be different due to the difference in the type (chemical structure) or the physical properties (molecular weight, melting point, boiling point, etc.) of the ultraviolet absorber (B).

As the ultraviolet absorber (B), either an organic ultraviolet absorber or an inorganic ultraviolet absorber may be used.

As the ultraviolet absorber (B), one type may be used alone, or two or more types may be used in combination.

The organic ultraviolet absorber may, for example, be a salicylate type ultraviolet absorber, a benzotriazole type ultraviolet absorber, a benzophenone type ultraviolet absorber, a cyanoacrylate type ultraviolet absorber, etc.

As the organic ultraviolet absorber, a compound having a molecular weight of from 200 to 1,000 is preferred. When the molecular weight is at least 200, it is less likely to volatilize in the melting and curing process of the powder coating material and can remain in the cured film. When the molecular weight is at most 1,000, it can remain in the fluororesin layer.

As the organic ultraviolet absorber, a compound having a melting point of from 50 to 150° C. is preferred. When the melting point is at least 50° C., it is less likely to volatilize in the melting and curing process of the powder coating material and can remain in the cured film. When the melting point is at most 150° C., it tends to be readily melted in the melting and curing process of the powder coating material and can remain in the fluororesin layer.

As the organic ultraviolet absorber, a compound having a volatilization temperature of from 180 to 400° C. is preferred, and a compound having a volatilization temperature of from 220 to 350° C. is particularly preferred. In the melting and curing process of the powder coating material, a temperature condition of from 150 to 220° C. is required, and therefore, within the above range, the organic ultraviolet absorber is less likely to volatilize and can easily remain in the fluororesin layer.

Commercial products of the organic ultraviolet absorber may, for example, be "Tinuvin (registered trademark) 326" (molecular weight: 315.8, melting point: 139° C.), "Tinuvin (registered trademark) 405" (molecular weight: 583.8, melting point: 74 to 77° C.), "Tinuvin (registered trademark) 460" (molecular weight: 629.8, melting point: 93 to 102° C.), "Tinuvin (registered trademark) 900" (molecular weight: 447.6, melting point: 137 to 141° C.), "Tinuvin (registered trademark) 928" (molecular weight: 441.6, melting point: 109 to 113° C.), manufactured by BASF Corporation, "Sanduvor (registered trademark) VSU powder" (molecular weight: 312.0, melting point: 123 to 127° C.) manufactured by Clariant Corporation, "Hastavin (registered trademark) PR-25 Gran" (molecular weight: 250.0, melting point: 55 to 59° C.) manufactured by Clariant Corporation, etc.

The inorganic ultraviolet absorber may, for example, be a filler-type inorganic ultraviolet absorber including ultraviolet absorbing oxides (such as zinc oxide, cerium oxide, etc.).

As the inorganic ultraviolet absorber, composite particles of titanium oxide and zinc oxide, composite particles of titanium oxide and cerium oxide, composite particles of zinc oxide and cerium oxide, composite particles of titanium oxide, zinc oxide and cerium oxide, etc. are preferred.

(Thermosetting Resin (C))

The thermosetting resin (C) is preferably one capable of layer separation without being compatible with the fluororesin (A) in the melting and curing process of the powder coating material. As the thermosetting resin (C), a curable acrylic resin, a curable polyester resin, a curable epoxy resin or a curable urethane resin, is preferred, and from such a viewpoint that the adhesion to a substrate is excellent and the fluororesin is less likely to contaminate the cured resin layer, a curable polyester resin or a curable acrylic resin is more preferred, and a curable polyester resin is particularly preferred.

Here, a curable resin means a polymer or compound having reactive groups, such as hydroxy groups, carboxy groups, epoxy groups, amino groups, etc.

<Curable Polyester Resin>

A curable polyester resin is a polymer wherein units derived from a polyvalent carboxylic acid compound and units derived from a polyhydric alcohol compound are linked by ester bonds, and it may have units other than these two types of units (for example, units derived from a hydroxy carboxylic acid compound, etc.).

With respect to the monomer unit present at a terminal of a polymer chain of the curable polyester resin (hereinafter referred to as the terminal unit), in a case where the terminal unit is a unit derived from a polyvalent carboxylic acid compound, the terminal unit has a carboxy group, and in a case where the terminal unit is a unit derived from a polyhydric alcohol compound, the terminal unit has a hydroxy group.

Units other than terminal units are divalent or higher valent units, and a linear polymer is composed solely of divalent units except for the terminal units. That is, a linear curable polyester resin is composed solely of divalent units derived from a poly valent carboxylic acid compound and divalent units derived from a polyhydric alcohol compound, except for the terminal units. A branched curable polyester resin has at least one trivalent or higher valent unit and composed substantially solely of divalent units except for such trivalent or higher valent units and terminal units. A trivalent or higher valent unit may, for example, be a unit having the respective hydroxy groups removed from three or more carboxy groups of a trivalent or higher polyvalent carboxylic acid compound, or a unit having the respective hydrogen atoms removed from three or more hydroxyl groups of a trihydric or higher polyhydric alcohol compound.

Hereinafter, units derived from a polyvalent carboxylic acid compound will be referred to also as "polyvalent carboxylic acid units", and units derived from a polyhydric alcohol compound will be referred to also as "polyhydric alcohol units".

The curable polyester resin is preferably a linear polymer, or a branched polymer having a small number of branches, particularly preferably a linear polymer. Since a branched polymer with many branches tends to have a high softening point or melting temperature, if the curing polyester resin is a branched polymer, the softening point is preferably at most 200° C. The curable polyester resin is preferably one which is solid at normal temperature and which has a softening point of from 100 to 150° C.

The number average molecular weight of the curable polyester resin is preferably at most 5,000, whereby the melt viscosity of the coating film may be made properly low. The mass average molecular weight of the curable polyester resin is preferably from 6,000 to 20,000, more preferably from 6,000 to 10,000, whereby the melt viscosity of the coating film may be made properly low. The curable polyester resin is more preferably one which has a number average molecular weight of at most 5,000 and a mass average molecular weight of from 6,000 to 20,000, and is particularly preferably one which has a number average molecular weight of at most 5,000 and a mass average molecular weight of from 6,000 to 10,000.

The curable polyester resin has a reactive group capable of reacting with the curing agent (D). At least a portion of a terminal unit of the polymer chain of the curable polyester resin is preferably a polyvalent carboxylic acid unit or a polyhydric alcohol unit, and in the case of the former, a free carboxy group of the unit will function as a reactive group, and in the case of the latter, a free hydroxy group of the unit will function as a reactive group. The unit having a reactive group may be a unit other than the terminal unit. For example, a divalent unit derived from a polyhydric alcohol compound having three or more hydroxy groups, is a unit having a free hydroxy group, and therefore, the curable polyester resin may have a divalent or higher valent unit having such a reactive group.

As the reactive group in the curable polyester resin, a hydroxy group is preferred, whereby the cured film will be excellent in water resistance, alkali resistance and acid resistance. A curable polyester resin usually has hydroxy groups and carboxy groups, and as the curable polyester resin, preferred is one which mainly has hydroxy groups.

The hydroxy value of the curable polyester resin is preferably from 20 to 100 mgKOH/g, particularly preferably from 30 to 80 mgKOH/g. The acid value is preferably from 1 to 80 mgKOH/g, particularly preferably from 3 to 50 mgKOH/g.

The hydroxy value and the acid value are measured in accordance with JIS K0070 (1992 edition).

The curable polyester resin is preferably a curable polyester resin (C1) having units derived from a $C_{8-15}$ aromatic polyvalent carboxylic acid compound and units derived from a $C_{2-10}$ polyhydric alcohol compound, whereby it is excellent in adhesion to the fluororesin layer, the cured film will be excellent in impact resistance, and dispersibility of a pigment (F), etc. will be excellent.

The polyvalent carboxylic acid units are preferably units derived from a $C_{8-15}$ aromatic polyvalent carboxylic acid compound. The $C_{8-15}$ aromatic polyvalent carboxylic acid compound is a compound having an aromatic ring and two or more carboxy groups, wherein the carboxy groups are attached to carbon atoms in the aromatic ring. Further, it may be an anhydride having a structure wherein two carboxy groups have been dehydrated.

The aromatic ring is preferably a benzene ring or a naphthalene ring, particularly preferably a benzene ring. In the case of the benzene ring, two or more may be present in one molecule.

The number of carboxy groups in the aromatic polyvalent carboxylic acid compound is preferably from 2 to 4, particularly preferably 2.

The $C_{8-15}$ aromatic polyvalent carboxylic acid compound may, for example, be phthalic acid, isophthalic acid, terephthalic acid, naphthalene dicarboxylic acid, trimellitic acid, pyromellitic acid, phthalic anhydride, etc.

The polyvalent carboxylic acid units are preferably units derived from isophthalic acid, since the obtainable cured film will be excellent in weather resistance.

The polyhydric alcohol units are preferably units derived from a $C_{2-10}$ polyhydric alcohol compound. The $C_{2-10}$ polyhydric alcohol compound is a compound having two or more hydroxy groups. The polyhydric alcohol compound is preferably an aliphatic polyhydric alcohol or an alicyclic polyhydric alcohol, particularly preferably an aliphatic polyhydric alcohol. The number of hydroxy groups in the polyhydric alcohol compound is preferably from 2 to 4, particularly preferably 2.

The $C_{2-10}$ polyhydric alcohol compound may, for example, be ethylene glycol, diethylene glycol, triethylene glycol, 1,2-propanediol, 1,3-propanediol, 1,3-butanediol, 1,4-butanediol diol, 1,5-pentanediol, neopentyl glycol, Spiro glycol, 1,10-decanediol, 1,4-cyclohexane dimethanol, trimethylol ethane, trimethylol propane, glycerine, pentaerythritol, etc.

The polyhydric alcohol units are preferably units derived from a $C_{3-8}$ polyhydric alcohol, particularly preferably units derived from a $C_{4-6}$ polyhydric alcohol, whereby adhesion to a substrate will be excellent, and flexibility will be excellent, so that even when heat history (thermal cycling) is applied, delamination from the fluororesin layer is less likely to occur.

As the polyhydric alcohol, neopentyl glycol, 1,2-pentanediol, 1,5-pentanediol, trimethylolpropane, etc. are preferred, and in view of easy availability, neopentyl glycol and trimethylol propane are more preferred.

The curable polyester resin may be produced by a known method for producing a polyester resin for a powder coating material by using an aromatic polyvalent carboxylic acid compound and a polyhydric alcohol compound as raw materials. For example, after subjecting the raw materials to esterification or ester exchange reaction at from 200 to 280° C., a polycondensation reaction is conducted at from 230 to 290° C. by using a catalyst under reduced pressure, and then, a depolymerization reaction is conducted with an alcohol component, to obtain a curable polyester resin.

In order to facilitate formation of a cured film of a double layered structure by layer separation of the fluororesin layer and the cured resin layer in the melting and curing process of a powder coating material, the curable polyester resin preferably has a suitable ester group concentration and an aromatic ring concentration.

The ester group concentration is one having the proportion of ester groups in the curable polyester resin represented by mass %, and can be obtained from the following formula (1).

$$\text{Ester group concentration (mass \%)} = 2m/[(a+b) \times m + a] \quad (1)$$

m: an average value of the number of units in the curable polyester resin, calculated from an average value of the molecular weight of each unit and a value of the number average molecular weight of the curable polyester resin.

a: an average value of the number of carbon atoms in the polyhydric alcohol units.

b: an average value of the number of carbon atoms in the polyvalent carboxylic acid units.

The ester group concentration in the polyester resin is preferably from 20 to 60 mass %, more preferably from 25 to 50 mass %, particularly preferably from 30 to 40 mass %.

The aromatic ring concentration is one having the proportion of the aromatic ring in the curable polyester resin represented by mmoL/g, and can be obtained from the following formula (2).

$$\text{Aromatic ring concentration (mmoL/g)} = [(\text{total number (moL) of aromatic rings in the raw materials used to obtain the curable polyester resin}) / (\text{total weight (g) of the raw materials used to obtain the curable polyester resin})] \times 1{,}000$$

The aromatic ring concentration in the curable polyester resin is preferably from 20 to 35 mmoL/g, more preferably from 22 to 34 mmoL/g, particularly preferably from 25 to 33 mmoL/g.

As commercial products of the curable polyester resin, "CRYLCOAT (registered trademark) 4642-3" and "CRYLCOAT (registered trademark) 4890-0", manufactured by Nihon Cytec Industries Inc., "GV-250", "GV-740" and "GV-175", manufactured by Nippon U-PICA Co., Ltd., etc. may be mentioned.

<Curable Acrylic Resin>

A curable acrylic resin is a polymer having units derived from a (meth)acrylate and has reactive groups such as carboxy groups, hydroxy groups, sulfo groups, epoxy groups, etc. Such a curable acrylic resin is excellent in dispersibility of the pigment (F).

The glass transition temperature of the curable acrylic resin is preferably from 30 to 60° C. When the glass transition temperature is at least the above lower limit value, blocking is less likely to occur. When the glass transition temperature is at most the above upper limit value, the obtainable cured film will be excellent in surface smoothness.

In a case where the curable acrylic resin has carboxy groups, the acid value of the curable acrylic resin is preferably from 150 to 400 mgKOH/g. When the acid value of the curable acrylic resin is at least the above lower limit value, there will be a dispersibility improving effect of the pigment (F). When the acid value of the curable acrylic resin is at most the above upper limit value, the obtainable cured film will be excellent in moisture resistance.

For the same reason, in a case where it has other reactive groups such as epoxy groups, its molecular weight per reactive group (e.g. epoxy equivalent) is preferably from 300 to 800.

As commercial products of the curable acrylic resin, "FINEDIC (registered trademark) A-249", "FINEDIC (registered trademark) A-251" and "FINEDIC (registered trademark) A-266", manufactured by DIC Corporation, "ALMATEX (registered trademark) PD6200" and "ALMATEX (registered trademark) PD7310", manufactured by Mitsui Chemicals Inc., "Sanpex PA-55" manufactured by Sanyo Chemical Industries Co., Ltd., etc. may be mentioned.

<Curable Epoxy Resin>

A curable epoxy resin is a compound (prepolymer) having two or more epoxy groups in the molecule. As such a curable epoxy resin, an aromatic compound having a glycidyloxy group or its oligomer, such as bisphenol A-diglycidyl ether or its oligomer, is preferred.

As commercial products of the curable epoxy resin, "Epikote (registered trademark) 1001", "Epikote (registered trademark) 1002" and "Epikote (registered trademark) 4004P", manufactured by Mitsubishi Chemical Co., Ltd., "EPICLON (registered trademark) 1050" and "EPICLON (registered trademark) 3050", manufactured by DIC Corporation, "EPOTOHTO (registered trademark) YD-012" and "EPOTOHTO (registered trademark) YD-014", manufactured by NIPPON STEEL & SUMIKIN CHEMICAL CO., LTD, "Denacol (registered trademark) EX-711" manufactured by Nagase ChemteX Corporation, "EHPE3150" manufactured by Daicel Corporation, etc. may be mentioned. Note: It is not necessary to call an epoxy resin as a "curable epoxy resin", but since "curable" is attached to other curable resins, the same is attached also to an epoxy resin.

<Curable Urethane Resin>

A curable urethane resin is a mixture obtained by mixing, or a resin obtained by reacting, a polyol (such as acrylic polyol, polyester polyol, polyether polyol, propylene glycol or propylene oxide) and an isocyanate compound. It is preferred to employ a powder coating material composed of a powder polyol (acrylic polyol, polyester polyol or polyether polyol) and a powder isocyanate.

(Curing Agent (D))

A curing agent (D) is a compound to cure a polymer (fluorocarbon resin (A) or thermosetting resin (C)) by reacting with reactive groups of the polymer to let the polymer be cross-linked or to have the molecular weight of the polymer increased. The curing agent (D) has at least two reactive groups capable of reacting with reactive groups (hydroxy groups, carboxy groups, epoxy groups, etc.) of the polymer. As such reactive groups of the curing agent (D), ones which are likely to react with the reactive groups of the polymer at room temperature are not desirable, and therefore, they are preferably reactive groups that can react when the powder coating material is heated and melted. For example, rather than isocyanate groups having highly reactive groups at room temperature, blocked isocyanate groups are preferred. Blocked isocyanate groups become isocyanate groups, when the powder coating is heated and melted to separate the blocking agent, and the isocyanate groups thus formed, will serve as reactive groups.

As a curing agent (D) for curing a curable resin having hydroxy groups or carboxy groups, a known compound may be used, and, for example, a blocked isocyanate curing agent, a β-hydroxyalkylamine curing agent, an epoxy curing agent, etc. may be mentioned. The β-hydroxyalkylamine curing agent may, for example, be a melamine resin, a guanamine resin, a sulfonamide resin, an urea resin, an aniline resin, etc., wherein a hydroxymethyl group or an alkoxymethyl group is bonded to the nitrogen atom of an amino group or an amide group.

In a case where a hydroxy group-containing fluoropolymer (A1) is used as the fluororesin (A), the curing agent (D) is preferably an isocyanate curing agent or a β-hydroxyalkyl amine curing agent, and from such a viewpoint that the adhesion to a substrate, the processability of the product after coating and the water resistance of the cured film will be excellent, a blocked isocyanate curing agent (D1) is particularly preferred.

In a case where a carboxy group-containing fluorinated polymer is used as the fluororesin (A), the curing agent (D) is preferably a β-hydroxyalkylamine curing agent or an epoxy-type curing agent such as a triglycidyl isocyanurate.

Also in a case where the thermosetting resin (C) is a curable resin having hydroxy groups or carboxy groups, curing agents similar to the above may be used. As a curing agent for a curable polyester resin, a blocked isocyanate curing agent (D1) or an epoxy curing agent is preferred.

Further, in a case where the thermosetting resin (C) is a curable resin having epoxy groups, a curing agent such as an amine curing agent, a curing agent having a carboxy group, an imidazole or a dicyandiamide may be used.

As the curing agent (D), one type may be used alone, or two or more types may be used in combination.

The softening temperature of the curing agent (D) is preferably from 10 to 120° C., particularly preferably from 40 to 100° C. When the softening temperature is at least the above lower limit value, the powder coating material is less likely to be cured at room temperature, and particle blocks are less likely to be formed. When the softening temperature is at most the above upper limit value, at the time of producing a powder by melt kneading the composition, it will be easy to homogeneously disperse the curing agent (D) in the powder, and the obtainable cured film will be excellent in surface smoothness, strength and moisture resistance.

As the blocked isocyanate curing agent (D1), one which is solid at room temperature, is preferred.

The blocked isocyanate curing agent (D1) is preferably one produced by reacting a polyisocyanate obtained by reacting an aliphatic, aromatic or araliphatic diisocyanate and a low molecular compound having active hydrogen, with a blocking agent, for masking.

The diisocyanate may, for example, be tolylene diisocyanate, 4,4'-diphenylmethane diisocyanate, xylylene diisocyanate, hexamethylene diisocyanate, 4,4'-methylenebis(cyclohexyl isocyanate), methylcyclohexane diisocyanate, bis(isocyanatomethyl) cyclohexane isophorone diisocyanate, dimer acid diisocyanate, lysine diisocyanate, etc.

The low molecular compound having active hydrogen may, for example, be water, ethylene glycol, propylene glycol, trimethylolpropane, glycerin, sorbitol, ethylenediamine, ethanolamine, diethanolamine, hexamethylenediamine, isocyanurate, uretdione, a low molecular weight polyester containing hydroxy groups, polycaprolactone, etc.

The blocking agent may, for example, be an alcohol (methanol, ethanol, benzyl alcohol, etc.), a phenol (phenol, cresol, etc.), a lactam (caprolactam, butyrolactam, etc.), an oxime (cyclohexanone, oxime, methyl ethyl ketoxime, etc.), etc.

In a case where the fluororesin (A) is a fluorinated polymer having reactive groups, the composition (α) contains a curing agent for curing the fluorinated polymer having reactive groups.

In a case where the curing agent in the composition (β) is different from the curing agent for curing the fluorinated polymer, the composition (α) and the composition (β) contain separate curing agents independently.

In a case where the curing agent for curing the fluorinated polymer and the curing agent in the composition (β) are of the same type, the composition (α) and the composition (β) may respectively contain the same curing agent, or the composition (α) may not contain a curing agent and only the composition (β) may contain the curing agent.

Specifically, for example, in a case where the fluororesin (A) is a hydroxy group-containing fluorinated polymer (A1), the thermosetting resin (C) is a curable polyester resin having hydroxy groups, and the curing agent (D) is an isocyanate curing agent (D1), the composition (α) and the composition (β) may each be a composition containing the blocked isocyanate curing agent (D1), or the composition (α) may not contain the blocked isocyanate curing agent (D1) and only the composition (β) may be a composition containing the blocked isocyanate curing agent (D1).

In a case where the curing agent for curing the fluorinated polymer having reactive groups and the curing agent in the composition (β) are of the same type, the curing agent (D) is preferably contained only in the composition (β) constituting the powder (Y), for the following reasons.

The fluororesin (A) (specifically the fluorinated polymer containing reactive groups, particularly the hydroxy group-containing fluorinated polymer (A1)) contained in the composition (α) has a high curing speed, so that it will be cured rapidly if a curing agent (D) is present, and a number of voids will be remained in a cured film derived from the powder (X). Therefore, the surface smoothness, flex resistance and impact resistance of the cured film tend to be insufficient.

When only the composition (β) contains the curing agent (D), at the initial stage in the melting and curing process of the powder coating material, the fluororesin (A) contained in the composition (α) will not contact with the curing agent (D). Therefore, the fluororesin (A) will be sufficiently molten, and it will be possible to form a uniform coating film derived from the powder (X). Thereafter, the curing agent (D) contained in the coating film derived from the powder (Y) is transferred to the coating film derived from the powder (X), whereby the fluororesin (A) will be cured, to form a cured film with little voids, i.e. being excellent in surface smoothness, flex resistance and impact resistance.

(Light Stabilizer (E))

A light stabilizer (E) is one to protect the cured resin layer from ultraviolet rays passed through the fluororesin layer.

The light stabilizer (E) is preferably a hindered amine light stabilizer having a molecular weight of from 300 to 5,000 and a melting point of from 50 to 250° C., from such a viewpoint that it is likely to be concentrated in the cured resin layer in the melting and curing process of the powder coating material. A hindered amine light stabilizer having a molecular weight of from 400 to 4,000 and a melting point of from 60 to 200° C. is more preferred from such a viewpoint that it will be uniformly diffused in the composition during kneading.

As the light stabilizer (E), one type may be used alone, or two or more types may be used in combination.

Commercial products of the hindered amine light stabilizer may, for example, be "Tinuvin (registered trademark) 111 FDL" (molecular weight: 2,000 to 4,000, melting point: 63° C.), "Tinuvin (registered trademark) 144" (molecular weight: 685, melting point: 146 to 150° C.) and "Tinuvin (registered trademark) 152" (molecular weight: 756.6, melting point: 83 to 90° C.), manufactured by BASF Corporation, "Sanduvor (registered trademark) 3051 powder" (molecular weight: 364.0, melting point: 225° C.), "Sanduvor (registered trademark) 3070 powder" (molecular weight: 1,500, melting point: 148° C.) and "VP Sanduvor (registered trademark) PR-31" (molecular weight: 529, melting point: 120 to 125° C.), manufactured by Clariant Corporation, etc.

When the composition (β) as the material for the powder (Y) contains a light stabilizer (E), the light stabilizer (E) will be present in the obtainable cured resin layer. Therefore, it is possible to prevent deterioration of the cured resin layer by ultraviolet rays that reach the cured resin layer as passed through the fluororesin layer, and it is possible to avoid such a problem that the fluororesin layer is peeled from the cured resin layer.

In the present invention, the light stabilizer (E) may be incorporated not only to the composition (β) as the material for the powder (Y), but also to the composition (α) as the material for the powder (X). However, from the viewpoint of suppressing the cost, the light stabilizer (E) should not be present in the fluororesin layer as far as possible, i.e. preferably should not be incorporated to the composition (α) as the material for the powder (X).

(Pigment (F))

Either one or both of the composition (α) and the composition (β) may further contain a pigment (F).

The pigment (F) is preferably at least one member selected from the group consisting of a luster pigment, an anticorrosive pigment, a coloring pigment and an extender pigment.

The luster pigment is a pigment composed of flaky powder particles to luster the coating film. The luster pigment may, for example, be aluminum powder, nickel powder, stainless steel powder, copper powder, bronze powder, gold powder, silver powder, mica powder, graphite powder, glass flakes, flaky iron oxide powder, mica, mica having the surface coated with a metal oxide, micaceous iron oxide, etc.

Flaky aluminum powder is preferably one having the aluminum surface covered with a single-layer or multi-layer coating film, for the purpose of corrosion prevention, discoloration prevention and improvement of the adhesion with the resin component by e.g. a bonded method.

Specific examples of the aluminum powder may, for example, be "PCF7640A", "PCF1440", "PCF7160", "7640NS" and "1440YL", tradenames, manufactured by Toyo Aluminium K.K.

Like other pigments, a luster pigment may be mixed together with components such as a resin, etc. and incorporated into the composition by melt-kneading. Otherwise, after the production of the powder, a luster pigment may be adhered to the powder particle surface by a method so-called a bonded method, to obtain a powder having the luster pigment. For example, in the present invention, after producing a powder composed of the composition (α) or the composition (β), the obtained powder, a luster pigment and a binder solution (provided that the solvent of the solution does not dissolve the powder) may be mixed, followed by removing the solvent by evaporation to let the luster pigment be attached to the powder particle surfaces via the binder, thereby to obtain the powder having the luster pigment (see JP-A-2004-175813, etc.).

As the binder, an adhesive resin is preferred, and, for example, a terpene resin, a terpene-phenol resin or a terpene-type hydrogenated resin may, for example, be mentioned.

An anticorrosive pigment is a pigment for preventing corrosion or deterioration of a substrate which requires corrosion resistance. As such an anticorrosive pigment, a lead-free anticorrosive pigment is preferred which presents little load on the environment. The lead-free anticorrosive pigment may, for example, be zinc cyanamide, zinc oxide, zinc phosphate, calcium magnesium phosphate, zinc molybdate, barium borate, zinc calcium cyanamide, etc.

A coloring pigment is a pigment for coloring the cured film. The coloring pigment may, for example, be titanium oxide, carbon black, iron oxide, phthalocyanine blue, phthalocyanine green, quinacridone, isoindolinone, benzimidazolone, dioxazine, etc.

An extender pigment is a pigment to improve the hardness of the cured film and to increase the thickness of the cured film. Further, it is preferably incorporated in that when the substrate is cut, the cut surface of the cured film can thereby be made clean. The extender pigment may, for example, be talc, barium sulfate, mica, calcium carbonate, etc.

An inorganic pigment including titanium oxide is likely to let a photocatalytic reaction proceed in a hot and humid region. The photocatalytic reaction is promoted by moisture and ultraviolet radiation. Since an inorganic pigment is likely be concentrated in the cured resin layer, titanium oxide tends to be concentrated in the cured resin layer, and gaps are likely to be formed between the cured resin and titanium oxide. When water enters in the gaps, the cured resin layer is deteriorated by the photocatalytic action of titanium oxide. In the cured film formed from the powder coating material of the present invention, the amount of ultraviolet rays that reach the cured resin layer, as passed through the fluororesin layer, is reduced, whereby the photocatalytic reaction scarcely proceeds in the cured resin layer. Therefore, even if titanium oxide is present in the cured resin layer, the cured resin layer is scarcely deteriorated by the photocatalytic reaction. Thus, even when a cured film is formed by using a powder coating material containing titanium oxide as a pigment, the fluororesin layer is scarcely peeled from the cured resin layer.

Titanium oxide is preferably one having surface treatment done so that a photocatalyst reaction is unlikely to proceed. Specifically, titanium oxide having been surface-treated with silica, alumina, zirconia, selenium, an organic component (polyol), etc. is preferred. Particularly preferred is titanium oxide having the titanium oxide content adjusted to from 83 to 90 mass % by such surface treatment. When the titanium oxide content is at least the above lower limit value, the cured film will be excellent in whiteness. When the titanium oxide content is at most the above upper limit value, the cured resin layer will be scarcely deteriorated, and the fluororesin layer will not be easily peeled.

Commercial products of titanium oxide may, for example, be "Tipaque (registered trademark) PFC105" (titanium oxide content: 87 mass %) and "Tipaque (trademark) CR95" (titanium oxide content: 90 mass %), manufactured by Ishihara Sangyo Kaisha, Ltd., "D918" (titanium oxide content: 85 mass %) manufactured by Sakai Chemical Industry Co. Ltd., "Ti-Pure (registered trademark) R960" (titanium oxide content: 89 mass %) and "Ti-Select (registered trademark)" (titanium oxide content: 90 mass %), manufactured by DuPont, etc.

(Curing Catalyst (G))

A curing catalyst (G) is to accelerate the curing reaction and to provide good chemical performance and physical performance to a cured film.

In the case of using a blocked isocyanate curing agent (D1), as the curing catalyst (G), a tin catalyst (tin octylate, tributyltin laurate, dibutyltin dilaurate, etc.) is preferred.

As the curing catalyst, one type may be used alone, or two or more types may be used in combination.

(Other Components (H))

Either one or both of the composition (α) and the composition (β) may contain other components (H), as the case requires.

Other components (H) may, for example, be a matting agent (ultrafine synthetic silica, etc.), a surfactant (nonionic surfactant, cationic surfactant or anionic surfactant), a leveling agent, a surface conditioner agent (to improve the surface smoothness of a cured film), a de-gas agent (having an effect to discharge air that is caught in the powder, a blocking agent coming out from the curing agent (D), moisture, etc. from the coating film so that they would not stay inside the cured film, and, normally, it is solid, but when melted, becomes to have a very low viscosity), a filler, a heat stabilizer, a thickener, a dispersing agent, an antistatic agent, a rust inhibitor, a silane coupling agent, an antifouling agent, a low pollution treatment agent, a non-fluororesin (excluding the thermosetting resin (C)), etc. Here, in the case where the fluororesin (A) is a PVDF, an acrylic resin (J) which is preferably contained in the composition (α) is an example of the above non-fluororesin.

(Acrylic Resin (J))

An acrylic resin (J) is a polymer having units derived from a (meth)acrylate and is a polymer having substantially no reactive groups. The acrylic resin (J) is preferably a homopolymer or copolymer of an alkyl methacrylate, more preferably a homopolymer or copolymer of an alkyl methacrylate, wherein the number of carbon atoms in the alkyl group is at most 4. In particular, a homopolymer of methyl methacrylate, or a copolymer of methyl methacrylate and ethyl methacrylate, is preferred.

The glass transition temperature of the acrylic resin (J) is preferably from 30 to 60° C. When the glass transition temperature is at least the above lower limit value, blocking is less likely to occur. When the glass transition temperature is at most the above upper limit value, the obtainable cured film will be excellent in surface smoothness.

The number average molecular weight of the acrylic resin (J) is preferably from 5,000 to 100,000, particularly preferably from 30,000 to 100,000. When the number average molecular weight of the acrylic resin (J) is at least the above lower limit value, blocking is less likely to occur. When the number average molecular weight of the acrylic resin (J) is at most the above upper limit value, the obtainable cured film will be excellent in surface smoothness.

The mass average molecular weight of the acrylic resin (J) is preferably from 6,000 to 150,000, more preferably from 40,000 to 150,000, particularly preferably from 60,000 to 150,000. When the mass average molecular weight of the acrylic resin (J) is at least the above lower limit value, blocking is less likely to occur. When the mass average molecular weight of the acrylic resin (J) is at most the above upper limit value, the obtainable cured film will be excellent in surface smoothness.

(Composition (α))

The content of the ultraviolet absorber (B) in the composition (α) is preferably from 0.01 to 15 parts by mass, to 100 parts by mass of the fluororesin (A) in the composition (α).

If the amount of the ultraviolet absorber (B) is too small, it will be impossible to sufficiently obtain the effect of reducing the amount of ultraviolet rays passing through the fluororesin layer and reaching the cured resin layer.

In a case where the ultraviolet absorber (B) is an inorganic ultraviolet absorber, the content of the ultraviolet absorber (B) in the composition (α) is particularly preferably from 0.01 to 3 parts by mass, to 100 parts by mass of the fluororesin (A) in the composition (α). The inorganic ultraviolet absorber is effective even in a small amount, and is less likely to be degraded, and therefore, its content may be small.

In a case where the ultraviolet absorber (B) is an organic ultraviolet absorber, the content of the ultraviolet absorber (B) in the composition (α) is particularly preferably from 0.1 to 5 parts by mass, to 100 parts by mass of the fluororesin (A) in the composition (α). The organic ultraviolet absorber is likely to be degraded, and therefore, its content may adjusted to be slightly large.

In a case where the composition (α) contains the curing agent (D), the content of the curing agent (D) in the composition (α) is preferably from 1 to 50 parts by mass, particularly preferably from 3 to 30 parts by mass, to 100 parts by mass of the fluororesin (A) in the composition (α).

In a case where the curing agent (D) is a blocked isocyanate curing agent (D1), the content of the blocked isocyanate curing agent (D1) in the composition (α) is preferably in such an amount that the molar ratio of the isocyanate group to the hydroxy group in the composition (α) would be from 0.05 to 1.5, particularly preferably from 0.8 to 1.2. When the molar ratio is at least the lower limit value in the above range, the hardness of the coating material becomes high, and the adhesion to the cured resin layer, the hardness and chemical resistance of the cured film, etc. will be excellent. When the molar ratio is at most the upper limit value in the above range, the cured film is unlikely to become brittle, and the cured film will be excellent in heat resistance, chemical resistance, moisture resistance, etc.

In a case where the composition (α) contains the curing catalyst (G), the content of the curing catalyst (G) in the composition (α) is preferably from 0.0001 to 10 parts by mass, to 100 parts by mass in total of the solid content other than the pigment (F). When the content of the curing catalyst is at least the above lower limit value, the catalytic effect tends to be sufficiently obtained. When the content of the curing catalyst is at most the above upper limit value, a gas such as air that has been included in the powder coating material during the melting and curing process of the powder coating material, is likely to be released, and there will be less reduction in the heat resistance, weather resistance and water resistance of the cured film caused by the remaining gas.

The total content of other components (H) in the composition (α) is preferably at most 45 mass %, particularly preferably at most 30 mass %, in the composition (α) (100 mass %).

In a case where the composition (α) contains PVDF as the fluororesin (A) and an acrylic resin (J) is used in combination, the content of the acrylic resin (J) in the composition (α) is preferably from 10 to 250 parts by mass, to 100 parts by mass of PVDF in the composition (α).

(Composition (β))

The content of the curing agent (D) in the composition (β) is preferably from 1 to 50 parts by mass, particularly preferably from 3 to 30 parts by mass, to 100 parts by mass of the thermosetting resin (C) in the composition (β). In a case where the composition (α) contains no curing agent to cure the fluororesin (A), and also the fluororesin (A) is cured by the curing agent (D) in the composition (β), the content of the curing agent (D) in the composition (β) includes also an amount necessary to cure the fluororesin (A).

In a case where the curing agent (D) is a blocked isocyanate curing agent (D1), the content of the blocked isocyanate curing agent (D1) in the composition (β) is preferably such an amount that the molar ratio of the isocyanate group to the hydroxy group in the composition (β) would be from 0.05 to 1.5, particularly preferably from 0.8 to 1.2. When the molar ratio is at least the lower limit value in the above range, the hardness of the coating material will be high, and the adhesion to the cured resin layer, the hardness and chemical resistance of the cured film, etc. will be excellent. When the molar ratio is at most the upper limit value in the above range, the cured film is unlikely to become brittle, and yet, the cured film will be excellent in heat resistance, chemical resistance, moisture resistance, etc.

In a case where the composition (α) contains no blocked isocyanate curing agent (D1) to cure the hydroxy group-containing fluorinated polymer (A1), and also the hydroxy group-containing fluorinated polymer (A1) is cured by the blocked isocyanate curing agent (D1) in the composition (β), the content of the blocked isocyanate curing agent (D1) in the composition (β) is preferably such an amount that the molar ratio of the isocyanate group to the hydroxy group in the total of the composition (α) and the composition (β) would be from 0.05 to 1.5, particularly preferably from 0.8 to 1.2.

The content of the light stabilizer (E) in the composition (β) is preferably from 0.05 to 20 parts by mass, particularly preferably from 0.1 to 15 parts by mass, to 100 parts by mass of the thermosetting resin (C) in the composition (β). When the content of the light stabilizer (E) is at least the above lower limit value, the protective effect for the cured resin layer will be sufficiently obtained. Even if the content of the light stabilizer (E) exceeds the above upper limit value, the protective effect for the cured resin layer will not be improved more than the level at the upper limit value.

In a case where the composition (β) contains the curing catalyst (G), the content of the curing catalyst (G) in the composition (β) is preferably from 0.0001 to 10 parts by mass, to 100 parts by mass in total of the solid content other than the pigment (F). When the content of the curing catalyst is at least the above lower limit value, the catalytic effect tends to be sufficiently obtained. When the content of the curing catalyst is at most the above upper limit value, a gas such as air that has been included in the powder coating material during the melting and curing process of the powder coating material, is likely to be readily released, and there will be less reduction in the heat resistance, weather resistance and water resistance of the cured film caused by the remaining gas.

The total content of other components (H) in the composition (β) is preferably at most 45 mass %, particularly preferably at most 30 mass %, in the composition (β) (100 mass %).

The total content of the pigment (F) in the composition (α) and the pigment (F) in the composition (β) is preferably from 20 to 200 parts by mass, particularly preferably from 50 to 150 parts by mass, to 100 parts by mass in total of the fluororesin (A) in the composition (α) and the thermosetting resin (C) in the composition (β).

In a case where the pigment (F) is a luster pigment, a part or entire amount of the luster pigment may not be blended in the composition (α) or the composition (β), and may be attached to the surface of powder particles of the powder (X) or powder (Y) to obtain a powder coating material. In that case, the total amount of the luster pigment on the powder particle surface is preferably from 0.1 to 40 parts by mass, particularly preferably from 1 to 20 parts by mass, to 100 parts by mass in total of the fluororesin (A) and the thermosetting resin (C) in the powder coating material.

(Mechanism of Action)

With the powder coating material of the present invention as described above, a cured film wherein a fluororesin layer composed mainly of the fluororesin (A) and a cured resin layer composed mainly of a cured product of the thermosetting resin (C) are layer-separated, can be formed by one coating. The cured film is excellent in weather resistance, since the cured resin layer is disposed on the substrate side, and the fluororesin layer is disposed on the air side.

Further, with the powder coating material of the present invention as described above, it is possible to form a cured film wherein a fluororesin layer in which the ultraviolet absorbent (B) is present, and a cured resin layer in which the light stabilizer (E) is present, are layer-separated. The cured resin layer is disposed on the substrate side, and the fluororesin layer is disposed on the air side, whereby the amount of ultraviolet rays passing through the fluororesin layer and reaching the cured resin layer is reduced, and deterioration of the cured resin layer by ultraviolet rays passing through the fluororesin layer and reaching the cured resin layer is suppressed. Therefore, the fluororesin layer will be scarcely peeled from the cured resin layer over a long period of time.

[Process for Producing Powder Coating Material]

The process for producing a powder coating material of the present invention is preferably a process comprising the following step (a1), step (b1), step (c1), step (a2), step (b2), step (c2) and step (d).

(a1)) a step of melt-kneading a mixture comprising the fluororesin (A) and the ultraviolet absorber (B) and, as the case requires, containing a curing agent (D), a light stabilizer (E), a pigment (F), a curing catalyst (G) and other components (H), to obtain a kneaded product composed of the composition (α).

(b1) a step of pulverizing the kneaded product composed of the composition (α) to obtain the powder (X).

(c1) as the case requires, a step of classifying the powder (X).

(a2) a step of melt-kneading a mixture comprising the thermosetting resin (C) other than a fluororesin, the curing agent (D) and the light stabilizer (E) and, as the case requires, containing an ultraviolet absorber (B), a pigment (F), a curing catalyst (G) and other components (H), to obtain a kneaded product composed of the composition (β).

(b2) a step of pulverizing the kneaded product composed of the composition (β) to obtain the powder (Y).

(c2) as the case requires, a step of classifying the powder (Y).

(d) a step of dry-blending the powder (X) and the powder (Y).

(Steps (a1) and (a2))

After preparing a mixture by mixing the respective components, the mixture is melt-kneaded to obtain a kneaded product in which the respective components are homogenized.

Each component is preferably preliminarily pulverized into a powder form.

The apparatus to be used for mixing may, for example, be a high speed mixer, a V type mixer, an inversion mixer, etc.

The apparatus to be used for melt-kneading may, for example, be a single screw extruder, a twin-screw extruder, a planetary gear, etc.

The kneaded product is, after cooling, preferably pelletized.

(Steps (b1) and (b2))

The apparatus to be used for pulverization may be a pulverizer such as a pin mill, a hammer mill, a jet mill, etc.

(Steps (c1) and (c2))

In order to remove powder particles with particle sizes being too large and powder particles with particle sizes being too small, it is preferred to carry out classification after the pulverization. At the time of carrying out the classification, it is preferred to remove at least either particles with particle sizes of less than 10 µm or particles with particle sizes exceeding 100 µm.

The classification method may, for example, be a method by sieving, an air classification method, etc.

The average particle size of the powder (X) and powder (Y) may, for example, be preferably from 25 to 50 µm by 50% average volume particle size distribution. Measurement of the particle size of the powder is usually carried out by means of a particle size measuring apparatus of e.g. a system to capture the potential change during passage through pores, a laser diffraction system, an image determination system, a sedimentation rate measurement system, etc.

(Step (d))

The apparatus to be used for dry blending may, for example, be a high-speed mixer, a double cone mixer, a kneader, a tumbler mixer, a mixing shaker, a drum shaker, a rocking shaker, etc.

The mixing ratio of the powder (X) to the powder (Y) (Powder (X)/Powder (Y)) is preferably from 20/80 to 80/20 (mass ratio), particularly preferably from 25/75 to 75/25 (mass ratio). When the proportion of the powder (X) is at least the above lower limit value, the cured film will be excellent in weather resistance. When the proportion of the powder (Y) is at least the above lower limit value, it is possible to reduce the cost of the cured film.

In a case where a powder coating material containing a luster pigment on the powder particle surfaces is to be produced, a luster pigment is deposited on the powder particle surfaces by e.g. a method so-called a bonded method. Specifically, for example, after the step (c1) or (c2), a luster pigment is deposited on the powder particle surfaces of at least either one of the obtained powder (X) and powder (Y), and using the obtained luster pigment-deposited powder, dry blending is carried out (step (d)), whereby it is possible to produce a powder coating material having the luster pigment incorporated. Otherwise, in some cases, it is also possible to let a luster pigment deposit on powder particles of the powder after dry blending, to produce a powder coating material having the luster pigment incorporated.

When a powder coating material containing a luster pigment on the powder particle surfaces, is to be produced, it is preferred that prior to dry blending in step (d), a luster pigment is deposited on the powder particle surfaces of either one or both of the powder (X) and the powder (Y), and then, the powder (X) and the powder (Y) are dry-blended.

The powder having a luster pigment deposited on the powder particle surfaces may be a part or whole of the powder. For example, as the powder (Y), only a powder having a luster pigment deposited on the powder particle surfaces may be used, or a powder having a luster pigment deposited on the powder particle surfaces and a powder having no luster pigment deposited thereon, may be used in combination.

[Process for Producing Coated Article]

The production process for a coated article of the present invention is a process for producing a coated article having a cured film on the surface of a substrate, which comprises the following step (e) and step (f).

(e) a step of coating a substrate with the powder coating material of the present invention, to form a coating film made of a melt of the powder coating material.

(f) a step of curing the coating film to form a cured film.

(Step (e))

The powder coating material of the present invention is applied on a substrate to form a coating film made of a melt of the powder coating material on the substrate. In the coating film, an upper layer composed mainly of a melt of the fluororesin (A) and a lower layer composed mainly of a melt of the thermosetting resin (C), are layer-separated, and reactive components in each layer undergo a curing reaction.

<Substrate>

The material for the substrate is preferably a metal such as aluminum, iron, magnesium, etc.

The shape, size, etc. of the substrate are not particularly limited.

<Method for Forming Coating Film>

The coating film made of a melt of the powder coating material may be formed at the same time as applying the powder coating material to the substrate, or may be formed, after depositing the powder of the powder coating material on the substrate, by heating and melting the powder on the substrate.

Almost at the same time as the powder coating material is heated and melted, the curing reaction of reactive components in the composition begins, and therefore, it is necessary to conduct the heat-melting of the powder coating material and its deposition on the substrate almost at the same time, or to conduct the heat-melting of the powder coating material after deposition of the powder coating material on the substrate.

The heating temperature (hereinafter referred to also as the "baking temperature") and the heating time (hereinafter referred to also as the "baking time") to heat and melt the powder coating material and to maintain the molten state for a predetermined period of time, are suitably set depending on e.g. the type and composition of the raw material components of the powder coating material, the thickness of the desired cured film, etc. Particularly, the baking temperature is preferably set depending upon the reaction temperature of the curing agent (D). For example, in the case of using a blocked polyisocyanate curing agent (D1) as the curing agent (D), the baking temperature is preferably from 170 to 210° C. The baking time is preferably from 5 to 120 minutes, particularly preferably from 10 to 60 minutes.

<Coating Method>

The coating method may, for example, be an electrostatic coating method, an electrostatic spraying method, an electrostatic immersion method, an atomizing method, a flow immersion method, a blowing method, a spraying method, a thermal spraying method, a plasma spraying method, etc. An electrostatic coating method using a powder coating gun is preferred from the viewpoint of excellent surface smoothness of the coating film even when the coating film is made thin, and further, from the viewpoint of excellent hiding properties of the cured film.

The powder coating gun may, for example, be a corona charging type coating gun or a friction charging type coating gun. The corona charging type coating gun is one to spray a powder coating material by corona discharge treatment. The friction charging type coating gun is one to spray a powder coating material by frictional charging treatment.

The discharge amount of the powder coating material from the powder coating gun is preferably from 50 to 200 g/min.

The distance from the tip of the gun portion of the powder coating gun to the substrate is preferably from 150 to 400 mm from the viewpoint of coating efficiency.

At the time of using the corona charge type coating gun, the load voltage applied to components constituting the powder coating material by corona discharge treatment is preferably from −50 to −100 kV, and it is more preferably from −60 to −80 kV from the viewpoint of excellent coating efficiency (proportion of the powder coating material deposited on the substrate) and appearance of the coating film.

At the time of using the friction charging type coating gun, the internally generated current value of the powder coating material by the frictional charging treatment is preferably from 1.0 to 8.0 µA from the viewpoint of excellent coating efficiency and appearance of the coating film.

In a case where the electrostatic coating method is to be industrially implemented, for example, a non-coated mirror is set up and a grounded conductive horizontal belt conveyor is laid for grounding in a coating chamber, and a gun is set at an upper portion in the coating chamber. The coating pattern width is preferably from 50 to 500 mm, the operating speed of the gun is preferably from 1 to 30 m/min., and the conveyor speed is preferably from 1 to 50 m/min. Suitable conditions may be selected from the above ranges depending upon the particular purpose.

From such a viewpoint that it is possible to form a relatively thick cured film, the coating method is preferably a fluidized bed dipping method.

In the fluidized bed dipping method, it is preferred that in a fluidized bed vessel in which the powder coating material flows as carried by a gas such as air, a substrate having the surface heated to a temperature of at least the melting temperature of the powder coating material, is dipped to let the powder deposit on the surface of the substrate and at the same time to let the powder be melted, to form a coating film with a predetermined thickness on the substrate, whereupon the coated substrate is taken out from the fluidized bed vessel, and as the case requires, the molten state of the coating film is maintained for a predetermined time, followed by cooling to cool and cure the molten state coating film, to obtain the substrate having a cured film formed.

The temperature in the fluidized bed vessel in the fluidized bed dipping method, is preferably from 15 to 55° C., and the temperature of the gas such as air blown into the fluidized bed vessel in order to fluidize the powder is also preferably from 15 to 55° C. The temperature of at least the surface of the substrate at the time of being dipped in the fluidized bed vessel is preferably from 300 to 450° C., and the time for dipping the substrate in the fluidized bed vessel is preferably from 1 to 120 seconds. The substrate taken out from the fluidized bed vessel is preferably maintained at a temperature of from 150 to 250° C. for from 1 to 5 minutes. (Step (f))

The molten state coating film is cooled to room temperature (20 to 25° C.) to form a cured film.

Cooling after baking may be either rapid cooling or slow cooling, but slow cooling is preferred, whereby interfacial peeling due to the difference in cure shrinkage between the fluorine resin layer and the cured resin layer is less likely to occur.

The thickness of the cured film is not particularly limited, but is preferably from 100 to 1,000 µm. In an application where weather resistance is highly demanded, such as an outdoor air conditioning unit installed along the coast, a traffic signal pole, a sign board, etc., from 100 to 200 µm is preferred. Here, as mentioned above, in a case where the thickness is thick, such can be achieved by selecting the fluidized bed dipping method.

EXAMPLES

Now, the present invention will be described in detail with reference to Examples and Comparative Examples. However, the invention is by no means limited thereto. Ex. 1 to 12 are Examples for producing a powder prior to dry blending, Ex. 13 to 17, 22 and 23 are Examples of the present invention, and Ex. 18 to 21 are Comparative Examples.

[Measuring Methods, Evaluation Methods]
(Glass Transition Temperature)

The glass transition temperature is the intermediate point glass transition temperature measured by a differential scanning calorimetry (DSC) method.

With respect to an acrylic resin (J), specifically, the glass transition temperature was measured as follows.

Using Thermal Analysis System (manufactured by Perkin Elmer), with respect to 10 mg of an acrylic resin (J), the heat balance was measured in a temperature range of from −25 to 200° C. at a temperature raising speed of 10° C./min, and from the inflection point of the obtained chart, the glass transition temperature was obtained by the midpoint method.

(Molecular Weights)

The number average molecular weight and the mass average molecular weight are values obtained as calculated as polystyrene by gel permeation chromatography (GPC) method.

With respect to an acrylic resin (J), specifically, they were measured as follows.

With respect to a 0.5% tetrahydrofuran (THF) solution of an acrylic resin (J), the molecular weights calculated as styrene were obtained by a GPC method using column TSKgelG4000XL (manufactured by Tosoh Corporation) at a flow rate of carrier (THF) being 1.0 mL/min.

(Melting Point)

Using Thermal Analysis System (manufactured by Perkin Elmer), with respect to 10 mg of an ultraviolet absorber, the heat balance was measured in a temperature range of from −25 to 200° C. at a temperature raising speed of 10° C./min, and the peak top was taken as the melting point of the ultraviolet absorber.

(Volatilization Temperature)

Using a differential thermal analysis and thermogravimetry simultaneous measurement device (manufactured by SII Nano Technology Inc., TG/DTA 7200), with respect to about 10 mg of an ultraviolet absorber, the temperature was raised within a temperature range of from 30 to 500° C. at a temperature raising speed of 10° C./min., whereby the temperature at which the mass is reduced 5% was taken as the volatilization temperature of the ultraviolet absorber.

(Average Particle Size)

The average particle size of a powder is a value obtained from the 50% average volume particle size distribution by measurement by means of a laser diffraction particle size distribution analyzer (manufactured by Sympatec Inc., Helos-Rodos).

(Appearance of Cured Film)
The state of the surface of a cured film was visually observed and judged by the following standards.
  ○ (Good): The cured film was excellent in surface smoothness, and no cissing or failure in wettability was observed.
  x (bad): The cured film was poor in surface smoothness, and cissing or failure in wettability was observed.
(Separation of Cured Film)
A cured film-attached aluminum plate was cut, and the cross-section of the cured film was observed by a scanning electron microscope under the following measurement conditions and judged by the following standards.
<Measurement Conditions>
  Testing machine: JSM-5900LV manufactured by Japan Electronics Co., Ltd.
  Accelerating voltage: 20 kV
  Magnification: 10,000 times
  Treatment before measurement: platinum coating at 20 mA for 45 seconds by Auto Fine coater JFC-1300 manufactured by Nippon Electronics Co., Ltd.
<Judgment Standards>
  ○ (good): The interface of the fluorine resin layer and the cured resin layer was confirmed.
  x (bad): The interface of the fluorine resin layer and the cured resin layer was not confirmed.
(Surface Smoothness of Cured Film)
Judged by using standard plates for visual judgment of smoothness by PCI (Powder Coating Institute). The standard plates are ten plates of 1 to 10, and the larger the number, the better the surface smoothness.
(Weather Resistance)
A cured film-attached aluminum plate was installed outdoor in Naha-city, Okinawa Prefecture, and the gloss of the surface of the cured film immediately before the installation and the gloss of the surface of the cured film after three years, were measured by means of a gloss meter (manufactured by Nippon Denshoku Kogyo Co., Ltd., PG-1M). When the value of the gloss immediately before the installation is set to be 100%, the percentage of the value of the gloss after the three years is calculated as a gloss retention (unit: %), and the weather resistance was judged according to the following standards. Here, the gloss retention was measured and calculated in accordance with JIS K5600-1-7.
  ○ (Good): The gloss retention was at least 80%, and no discoloration of the cured film or no peeling of the fluororesin layer was observed.
  x (bad): The gloss retention was less than 80%, and discoloration of the cured film or peeling of the fluororesin layer was observed.
(Accelerated Weathering)
Using a xenon weather meter (manufactured by Suga Test Instruments Co., Ltd.), the time until a fluororesin layer was peeled (exfoliation time), was measured. Usually water is sprayed, but instead of spraying water, a 1% aqueous hydrogen peroxide solution was used for the test.
<Test Conditions>
  Relative humidity: 70% RH,
  Temperature: 50° C.,
  Light source: 80 W/m$^2$ (300 to 400 nm).
(Flex Resistance)
Judged in accordance with JIS K5600-5-1. Using a bending test apparatus, the minimum diameter of a mandrel where the cracking or peeling of a cured film begins, was measured. The lower the number, the better the flex resistance.
  ○ (Good): The minimum diameter of a mandrel where the cracking or peeling of a cured film begins is less than 6 mm.
  x (bad): The minimum diameter of a mandrel where the cracking or peeling of a cured film begins is at least 6 mm.
(Falling Weight Test)
Judged in accordance with JIS K5600-5-3. Using a DuPont type impact deformation tester, a weight of 500 g was dropped from a height of 70 cm, and occurrence of cracking or peeling of the cured film was visually judged.
  ○ (Good): No cracking or peeling was observed in the cured film.
  x (bad): Cracking or peeling was observed in the cured film.

Production Example 1

(Production of Fluororesin (A1-1))
Into a stainless steel autoclave equipped with a stirrer and having an inner volume of 250 mL, 51.2 g of CHVE, 13.3 g of 4-hydroxybutyl vinyl ether, 55.8 g of xylene, 15.7 g of ethanol, 1.1 g of potassium carbonate, 0.7 g of a 50 mass % xylene solution of tert-butyl peroxypivalate and 63 g of CTFE were introduced. The temperature was gradually raised, and after reaching 55° C., held for 20 hours. It was heated to 65° C. and held for 5 hours. After cooling, filtration was conducted to remove the residue to obtain 119.9 g of the fluororesin (A1-1) as a hydroxy group-containing fluoropolymer. The glass transition temperature of the fluororesin (A1-1) was 54° C., and the number average molecular weight was 12,000.

Production Example 2

(Production of Thermosetting Resin (C-1))
Into a stainless steel autoclave equipped with a stirrer and having an inner volume of 250 mL, 31.7 g of terephthalic acid, 21.6 g of neopentyl glycol and 2.0 g of xylene were charged, and the temperature was gradually raised from 100° C., and an esterification reaction was conducted at 250° C. for 4 hours. As a catalyst, 0.01 g of antimony trioxide was added, the pressure was reduced to at most 0.5 mmHg, and a polycondensation reaction was conducted at 280° C. for 3 hours, to obtain 52.2 g of the thermosetting resin (C-1) as a curable polyester resin. The glass transition temperature of the thermosetting resin (C-1) was 58° C., the number average molecular weight was 4,400, and the mass average molecular weight was 7,200.

Production Example 3

(Production of Acrylic Resin (J-1))
Into a four-necked flask having an inner volume of 1 L and equipped with a condenser and a thermometer, 200 mL of deionized water, 2 g of a reactive emulsifier (manufactured by Sanyo Chemical Industries, Ltd., ELEMINOL (registered trademark) JS-2, succinate derivative) and 2 g of polyoxyethylene nonylphenyl ether (ethylene oxide 10 mol adduct) were added. When the temperature reached 80° C. in a warm bath under a nitrogen stream, 10 mL of a 2 mass % aqueous solution of ammonium persulfate was added. A mixture of 140.2 g of methyl methacrylate, 80.0 g of ethyl methacrylate and 0.2 g of n-lauryl mercaptan as a chain transfer agent, was dropwise added over a period of 1 hour. Immediately thereafter, 1 mL of a 2 mass % aqueous solution of ammonium persulfate was added to start the reaction. After 3 hours, the temperature in the flask was raised to 85° C. and held for 1 hour, followed by filtration with a 300-mesh metal gauze to obtain a blue-white aqueous dispersion. The aqueous dispersion was freeze coagulated at −25° C., and, after dehydration and washing, vacuum dried at 80° C., to obtain 209.2 g of the acrylic resin (J-1) as a white powder-form acrylic resin. The glass transition temperature of the acrylic resin (J-1) was 40° C., the number average molecular weight was 65,000, and the mass average molecular weight was 110,000.

[Components Used for Preparing Powder Coating Material]

Fluororesin (A-2): PVDF (manufactured by Dongyue Co., PVDF DS203, mass average molecular weight: 270,000, number average molecular weight: 160,000, melting point: 170° C.).

Ultraviolet absorber (B-1): organic ultraviolet absorber (BASF Corp., Tinuvin (registered trademark) 405, molecular weight: 583.8, melting point: 76.3° C., volatilization temperature: 348.5° C.).

Curing agent (D1-1): blocked isocyanate curing agent (manufactured by Degussa, VESTAGON (registered trademark) B1530).

Ex. 1 to 12

(Production of Powder for Powder Coating Material)

The components listed in Table 1 were mixed for about 10 to 30 minutes using a high speed mixer (manufactured by Yusaki Co., Ltd.) to obtain a powdery mixture. The mixture was subjected to melt-kneading by means of a biaxial extruder (manufactured by Thermo Prism Ltd., 16 mm extruder) at a barrel temperature set at 120° C., to obtain pellets. The pellets were pulverized at room temperature using a pulverizer (manufactured by FRITSCH Co., rotor speed mill P14), followed by classification by means of a 150 mesh sieve, to obtain a powder for powder coating material having an average particle size of about 40 μm.

Here, in Example 12, after the powder containing no pigment (F-1) was produced in the same manner as described above, the pigment (F-2) was attached to the obtained powder particle surface in the same manner as in Example 1 disclosed in JP-A-2004-175813, to prepare a powder (Y-4).

TABLE 1

| | Ex. | | 1 | 2 | 3 | 4 | 5 | 6 |
|---|---|---|---|---|---|---|---|---|
| Blend amounts (parts by mass) | Fluororesin (A) | (A1-1) | 52.0 | 52.0 | — | 52.0 | — | — |
| | | (A-2) | — | — | 45.5 | — | — | — |
| | Acrylic resin (J-1) | | — | — | 19.5 | — | — | — |
| | Ultraviolet absorber (B-1) | | 4.0 | 4.0 | 4.0 | — | 4.0 | — |
| | Thermosetting resin (C-1) | | — | — | — | — | 57.0 | 57.0 |
| | Curing agent (D1-1) | | — | 13.0 | — | — | 21.0 | 21.0 |
| | Light stabilizer (E) | | — | 2.0 | — | — | 2.0 | 2.0 |
| | Pigment (F) | | 35.0 | 35.0 | 35.0 | 35.0 | 35.0 | 35.0 |
| | Pigment (F-2) | | — | — | — | — | — | — |
| | Curing catalyst (G-1) | | 0.0063 | 0.0063 | — | 0.0063 | 0.0063 | 0.0063 |
| | Other components (H-1) | | 0.4 | 0.4 | 0.4 | 0.4 | 0.4 | 0.4 |
| | (H) | (H-2) | 1.0 | 1.0 | 1.0 | 1.0 | 1.0 | 1.0 |
| | Powder | | (X-1) | (X-2) | (X-3) | (Z-1) | (Y-1) | (Y-2) |

| | Ex. | | 7 | 8 | 9 | 10 | 11 | 12 |
|---|---|---|---|---|---|---|---|---|
| Blend amounts (parts by mass) | Fluororesin (A) | (A1-1) | — | — | — | 52.0 | 52.0 | — |
| | | (A-2) | — | — | — | — | — | — |
| | Acrylic resin (J-1) | | — | — | — | — | — | — |
| | Ultraviolet absorber (B-1) | | — | 4.0 | — | 4.0 | 4.0 | 4.0 |
| | Thermosetting resin (C-1) | | 57.0 | 57.0 | 57.0 | — | — | 57.0 |
| | Curing agent (D1-1) | | 8.0 | 21.0 | 21.0 | — | 13.0 | 21.0 |
| | Light stabilizer (E) | | 2.0 | — | — | — | — | 2.0 |
| | Pigment (F) | | 35.0 | 35.0 | 35.0 | — | — | — |
| | Pigment (F-2) | | — | — | — | — | — | 12.0 |
| | Curing catalyst (G-1) | | 0.0063 | 0.0063 | 0.0063 | — | 0.0063 | 0.0063 |
| | Other components (H-1) | | 0.4 | 0.4 | 0.4 | 0.4 | 0.4 | 0.4 |
| | (H) | (H-2) | 1.0 | 1.0 | 1.0 | 1.0 | 1.0 | 1.0 |
| | Powder | | (Y-3) | (Z-2) | (Z-3) | (X-4) | (X-5) | (Y-4) |

Light stabilizer (E-1): hindered amine light stabilizer (manufactured by BASF Corp., Tinuvin (registered trademark) 111FDL).

Pigment (F-1): Titanium oxide (manufactured by DuPont, Ti-Pure (registered trademark) R960, titanium oxide content: 89 mass %).

Aluminum flake (F-2): aluminum flake pigment for powder coating material (manufactured by Toyo Aluminum Co., Ltd., trade name "PCF7640A", average particle size: 21 μm, average thickness: 0.6 μm)

Curing catalyst (G-1): dibutyltin dilaurate.

Degassing agent (H-1): benzoin.

Surface conditioning agent (H-2): leveling agent for powder coating material (manufactured by BYK-Chemie Inc., BYK (registered trademark)-360P).

Ex. 13 to 23

(Production of Powder Coating Material)

The respective powders shown in Table 2 in an amount of 500 g each, were dry-blended at room temperature for one minute by using a high-speed mixer (manufactured by Earth Technica Co., capacity 2 L) under the conditions of 500 revolutions per minute of the agitator blade and 4,000 revolutions per minute of the chopper blade, to produce a powder coating material.

(Preparation of Test Piece)

Using an electrostatic coater (manufactured by Onoda Cement Co., GX3600C), a powder coating material was applied by electrostatic coating on one surface of an aluminum plate subjected to chromate treatment and kept for 20 minutes in a 200° C. atmosphere. The coated plate was allowed to cool to room temperature to obtain the aluminum plate with a cured film having a thickness of 55 to 65 μm. The obtained cured film-coated aluminum plate was used as a test piece and evaluated. The results are shown in Table 2.

TABLE 2

|  |  | Examples | | | | | Comparative Examples | | | | Examples | |
| --- | --- | --- | --- | --- | --- | --- | --- | --- | --- | --- | --- | --- |
|  |  | 13 | 14 | 15 | 16 | 17 | 18 | 19 | 20 | 21 | 22 | 23 |
| | Powders | (X-1) | (X-1) | (X-1) | (X-2) | (X-3) | (X-1) | (X-1) | — | — | (X-4) | (X-5) |
| | | (Y-1) | (Y-2) | (Y-3) | (Y-3) | (Y-3) | — | — | — | (Y-1) | (Y-4) | (Y-4) |
| | | — | — | — | — | — | — | — | (Z-1) | (Z-1) | — | — |
| | | — | — | — | — | — | (Z-2) | (Z-3) | (Z-3) | — | — | — |
| Evaluation of cured film | Appearance | ○ | ○ | ○ | ○ | ○ | ○ | ○ | ○ | ○ | ○ | ○ |
| | Separation | ○ | ○ | ○ | ○ | ○ | ○ | ○ | ○ | ○ | ○ | ○ |
| | Surface smoothness | 6 | 6 | 6 | 4 | 6 | 6 | 6 | 6 | 6 | 6 | 6 |
| | Weather resistance | ○ | ○ | ○ | ○ | ○ | ○ | ○ | x | ○ | ○ | ○ |
| | Accelerated weathering (time) | 200 | 200 | 200 | 200 | 200 | 100 | 100 | 45 | 100 | 200 | 200 |
| | Flex resistance | ○ | ○ | ○ | x | ○ | ○ | ○ | ○ | ○ | ○ | ○ |
| | Falling weight test | ○ | ○ | ○ | x | ○ | ○ | ○ | ○ | ○ | ○ | ○ |

The cured films produced by using the powder coating materials in Ex. 13 to 17, 22 and 23, were confirmed to have layers separated such that the cured resin layer was disposed on the substrate side and the fluororesin layer was disposed on the air side, and they showed excellent weather resistance and accelerated weathering resistance.

When Ex. 15 and Ex. 16 are compared, Ex. 15 was superior to Ex. 16 in the surface smoothness, flex resistance, and falling-weight shock resistance. This is considered to be attributable to that the powder (X) in Ex. 15 contained no curing agent (D), whereby it was possible to control the rate of formation of the fluororesin layer so that voids (spaces) were less likely to be formed in the cured film.

The cured films produced by using the powder coating materials of Ex. 18 to 21 were confirmed to have layers separated such that the cured resin layer was disposed on the substrate side and the fluororesin layer was disposed on the air side, but the accelerated weathering resistance was insufficient. Especially, a problem that the fluororesin layer disposed on the air side was peeled, occurred. Among them, the cured film prepared by using the powder coating material of Ex. 20 was significantly insufficient in accelerated weathering resistance, and it was also insufficient in weather resistance.

The above results indicate that it is necessary that an ultraviolet absorbent is sufficiently present in the fluororesin layer disposed on the air side, and a light stabilizer is sufficiently present in the cured resin layer disposed on the substrate side.

INDUSTRIAL APPLICABILITY

The powder coating material of the present invention is useful for forming a cured film on a surface of e.g. a traffic signal, a telephone pole, a road sign pole, a bridge, a railing, a building material (gate, fence, siding material for a house, curtain wall, roof, etc.), a car body or parts (bumper, wiper blade, etc.), a household appliance (outdoor unit of air conditioner, exterior of water heater, etc.), a blade for wind power generation, a solar cell back sheet, a back surface of a heat collection mirror for solar power generation, a NAS battery exterior, etc.

This application is a continuation of PCT Application No. PCT/JP2014/069848, filed on Jul. 28, 2014, which is based upon and claims the benefit of priority from Japanese Patent Application No. 2013-157168 filed on Jul. 29, 2013. The contents of those applications are incorporated herein by reference in their entireties.

What is claimed is:

1. A powder coating material, comprising:
    a powder (X) comprising a composition (α) comprising a fluororesin (A) and an ultraviolet absorber (B); and
    a powder (Y) comprising a composition (β) comprising a thermosetting resin (C) other than a fluororesin, a curing agent (D) and a light stabilizer (E),
    wherein:
    the composition (α) does not contain a curing agent; and
    the composition (β) does not contain a fluororesin.

2. The powder coating material according to claim 1, wherein a mixing ratio of the powder (X) to the powder (Y) (powder (X)/powder (Y)) is from 20/80 to 80/20 (mass ratio).

3. The powder coating material according to claim 1, wherein the fluororesin (A) is a hydroxy group-containing fluorinated polymer (A1).

4. The powder coating material according to claim 3, wherein:
    the curing agent (D) in the composition (β) is a blocked isocyanate curing agent; and
    the composition (α) does not comprise a blocked isocyanate curing agent.

5. The powder coating material according to claim 1, wherein the fluororesin (A) is a polyvinylidene fluoride.

6. The powder coating material according to claim 5, wherein the composition (α) further comprises an acrylic resin (J).

7. The powder coating material according to claim 1, wherein the thermosetting resin (C) is at least one member selected from the group consisting of a curable acrylic resin, a curable polyester resin, a curable epoxy resin and a curable urethane resin.

8. The powder coating material according to claim 1, wherein:
    the thermosetting resin (C) is a curable polyester resin; and
    the curing agent (D) is a blocked isocyanate curing agent.

9. The powder coating material according to claim 1, wherein either one or both of the composition (α) and the composition (β) further comprises a pigment (F).

10. The powder coating material according to claim 1, wherein either one or both of the powder (X) and the powder (Y) comprise, as powder particles constituting the powder, powder particles having a luster pigment attached to the powder particle surfaces.

11. A process for producing the powder coating material of claim 1, the process comprising:
  (a1) melt-kneading a mixture comprising the fluororesin (A) and the ultraviolet absorber (B) to obtain a kneaded product comprising the composition (α);
  (b1) pulverizing the kneaded product comprising the composition (α) to obtain the powder (X);
  (a2) melt-kneading a mixture comprising the thermosetting resin (C) other than a fluororesin, the curing agent (D) and the light stabilizer (E) to obtain a kneaded product comprising the composition (β);
  (b2) pulverizing the kneaded product comprising the composition (β) to obtain the powder (Y); and
  (d) dry-blending the powder (X) and the powder (Y), to obtain the powder coating material.

12. The process of claim 11, wherein either one or both of the mixture in the step (a1) and the mixture in the step (a2) further comprise a pigment (F).

13. The process of claim 11, wherein before dry-blending in the step (d), a luster pigment is attached to the powder particle surfaces of either one or both of the powder (X) and the powder (Y), and then, the powder (X) and the powder (Y) are dry-blended.

14. A coated article having a cured film of the powder coating material of claim 1, on the surface of a substrate, wherein:
  the fluororesin (A) is selected from the group consisting of a hydroxy group-containing fluoropolymer and a polyvinylidene fluoride;
  the ultraviolet absorber (B) is an organic ultraviolet absorber selected from the group consisting of a salicylate-containing ultraviolet absorber, a benzotriazole-containing ultraviolet absorber, a benzophenone-containing ultraviolet absorber, a cyanoacrylate-containing ultraviolet absorber and a hydroxyphenyl triazine-containing ultraviolet absorber;
  the thermosetting resin (C) is a curable polyester resin;
  the curing agent (D) is a blocked isocyanate curing agent
  the light stabilizer (E) is a hindered amine light stabilizer;
  a content of the ultraviolet absorber (B) in the composition (α) is 0.01 to 15 parts by mass relative to 100 parts by mass of the fluororesin (A);
  a content of the curing agent (D) in the composition (β) is 1 to 50 parts by mass relative to 100 parts by mass of the thermosetting resin (C);
  a content of the light stabilizer (E) in the composition (β) is 0.05 to 20 parts by mass relative to 100 parts by mass of the thermosetting resin (C); and
  a mixing ratio of the powder (X) to the powder (Y) is from 20/80 to 80/20 (mass ratio).

15. A process for producing a coated article having a cured film on the surface of a substrate, the process comprising:
  (e) coating a substrate with the powder coating material of claim 1, to form a coating film made of a melt of the powder coating material; and
  (f) curing the coating film to form a cured film.

16. The powder coating material according to claim 1, wherein the composition (α) does not contain a thermosetting resin.

17. The powder coating material according to claim 1, wherein the fluororesin (A) is a fluorinated polymer having reactive groups.

* * * * *